Feb. 5, 1957

L. D. BARLEY 2,780,204

HYDRAULIC MOTIVE POWER SYSTEM

Filed Dec. 29, 1953

*INVENTOR.*
LEO D. BARLEY
BY
Marechal Biebel French & Bugg
ATTORNEYS

United States Patent Office 2,780,204
Patented Feb. 5, 1957

2,780,204

HYDRAULIC MOTIVE POWER SYSTEM

Leo D. Barley, Dayton, Ohio, assignor to Harris-Seybold Company, Cleveland, Ohio, a corporation of Delaware Application December 29, 1953, Serial No. 400,863

10 Claims. (Cl. 121—45)

This invention relates to hydraulic systems more particularly to a hydraulic motive power system and the control thereof.

It is the principal object of the invention to provide a hydraulic motive power system for operation of a hydraulic motor from a source of constant volume in which the motor may be started, stopped and reversed, smoothly and substantially free of shock under all conditions. It is also an object to provide such a system in which the motor may be started at either a fast speed or a slow speed, under both of which conditions shock or abrupt motion of the motor is avoided.

It is another object to provide such a system in which the motor may be operated selectively at a fast and then at a slow speed with the transition from fast to slow being made under controlled deceleration conditions assuring a smooth transfer from one speed to the other.

It is a further object to provide such a system in which the motor is arranged to operate in a forward direction on a work stroke at relatively slow speed and under full operating pressure and on a reverse or return stroke at relatively high speed and under reduced pressure.

Other objects and advantages will be apparent from the following description, the accompanying drawing, and the appended claims.

Figure 3:
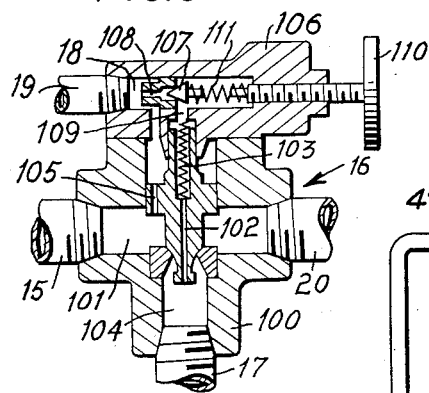
Fig. 3 is a detail sectional view illustrating the pressure control valve in the system of Fig. 1.

Referring to the drawing which illustrates a preferred embodiment of the invention, a reservoir or tank is shown at 10 for the hydraulic fluid which is picked up through strainer 11, line 12, and supplied to pump 13 which is of the type adapted to supply the fluid under pressure and at substantially constant volume. The pump delivers the fluid under pressure to pressure line 15 which connects with an adjustable relief valve shown at 16. This valve has a connection 17 for returning discharged fluid back to tank 10, and in addition has a vent port 18 connecting with a control line 19, the pressure in the vent port and the control line 19 being such as to result in a corresponding pressure condition on the delivery side of the relief valve 16 which connects with pressure supply line 20.

Valves of this type are shown, for example, in Vickers Patent No. 2,043,453, and a suitable valve for this purpose is that known as Vickers type CG-06BV and shown in Fig. 3. This valve includes a valve body 100 having a through bore 101 to which the lines 15 and 20 are connected. The piston 102 is normally biased by a spring 103 to a position closing the port 104 to which the line 17 is connected, and a bleed passage 105 in piston 102 connects the bore 101 with the vent port 18 in the auxiliary valve housing 106. The adjustable spring-loaded valve 107 in turn controls a valve seat 108 connecting the port 18 with the passage 109 leading through piston 102 to port 104, and the handle 110 provides for adjustable control of the pressure of spring 111 and thus in turn determines the pressure at which hydraulic fluid is delivered into the line 20.

Pressure line 20 leads to the pressure port P of a directional valve 25 which controls the flow of fluid to and from the motor. This valve is of the open center 4-way type and is solenoid operated as indicated by fast-acting solenoids 26 and 27, arranged to be selectively energized for controlling the several valve positions. In addition to the supply port P, valve 25 has a discharge port T from which line 28 leads back to the tank 10, and it is further provided with two delivery ports A and B, a supply line 30 being connected to port A and a return line 31 to port B. An example of a valve suitable for the purpose is Vickers type DG5S4-060-C.

When valve 25 is deenergized it blocks both ports A and B, and connects port P to port T thereby returning the flow of pressure fluid directly to the tank 10. In response to energization of solenoid 26, it connects port P to port A and port B to port T. Upon energization of solenoid 27, it connects port P to port B and port A to port T.

Figure 1:
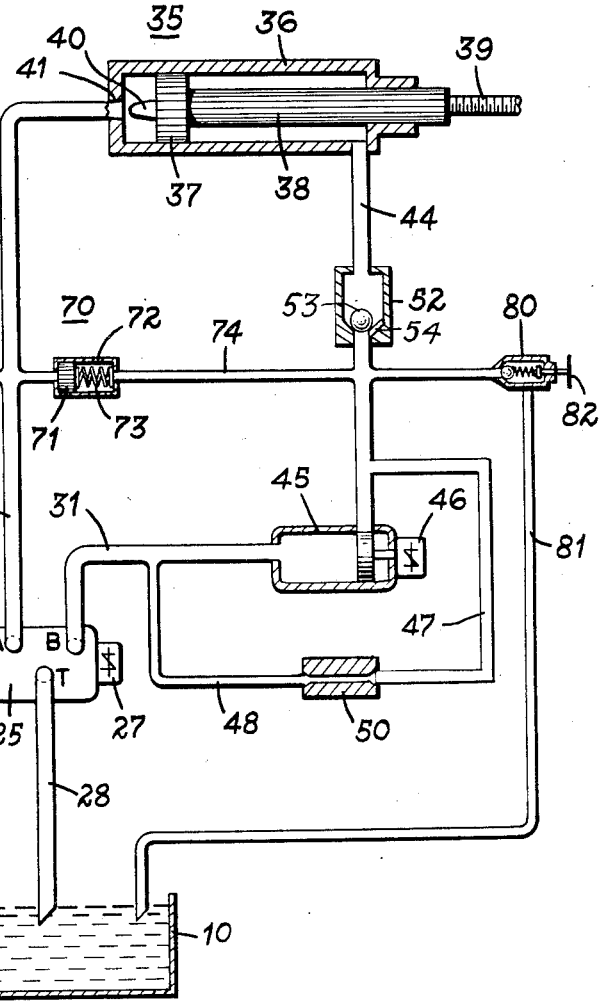
Fig. 1 is a diagrammatic showing of the hydraulic system in accordance with the present invention.

The hydraulic motor is shown generally at 35, this motor being either a rotary vane type or a piston and cylinder type as desired for the particular installation. For purposes of illustration it is here shown in Fig. 1 as embodying cylinder 36 and piston 37 connected to piston rod 38 which has a connection 39 at its outer end for the working member. It may be considered as performing a power or working stroke when traveling from left to right in the drawing, and as being on a return stroke when traveling from right to left. It will also be noted that there is a substantial differential in the effective area on opposite sides of the piston, the area on the side producing the working stroke being substantially greater than that on the side producing the return stroke. A choke 40 is also shown adapted to cooperate with a seat 41 in the head of the cylinder to cushion the final travel of the piston on its return stroke.

Supply line 30 connects directly with the large area side of the piston, and in return flow conduit 44 similarly connects with the return flow side of the piston. Conduit 44 and return flow line 31 both connect with a fast control valve 45 which is likewise solenoid actuated as indicated at 46 and which is normally closed when the solenoid is deenergized. At this time the only flow path available is through auxiliary lines 47 and 48 which connect to slow regulator 50, in the form of a control element having an open passage of restricted size such as to permit only a greater reduced volume of flow therethrough. A flow regulator valve 52 is included in return line 44 which limits the flow in the direction away from cylinder 36 to a predetermined maximum to thereby control the fast speed on the working stroke to a proper value, but offers substantially no resistance to flow in the opposite direction so that flow at a greater rate in the reverse direction is permitted. This regulator valve is accordingly shown diagrammatically as including a ball 53 having a slotted seat 54 providing for limited flow away from cylinder 36 in the seated position of ball 53 and for full flow in the opposite direction.

It will be noted that the fast valve 45 is thus connected to by-pass slow regulator 50, and when open allows a much greater volume of flow through the system. For example, with the fast valve energized and in open position the flow may be as much as 50 times that which can occur with the valve closed and the flow restricted by slow regulator 50. Thus by selective energization of fast valve 45 the motor may be actuated at either a fast or a slow rate of speed on its working stroke.

In order to overcome the tendency toward pressure surges and shock when operation of the motor is initiated, a vent cushion 55 is connected to line 19, comprising a piston 56 yieldably urged toward normal seated position in cylinder 57 by spring 58. Since the pressure in line 19 corresponds with and controls that in pressure line 20, a pressure surge in the latter will be transmitted to piston 56, and such transient increase above the normal pressure in such line will cause piston 56 to move against spring 58, thereby relieving the pressure in line 19, and correspondingly reducing the pressure in pressure line 20. In this way the objectionable shock condition which would be likely to occur upon the initial supply of fluid to actuate the motor, is effectively overcome.

A differential relief control 60 is also connected to line 19, this control having a spring urged member 59 which unseats when the pressure exceeds a predetermined value for which the valve is set, allowing fluid to bleed off therethrough, and thereby to maintain a predetermined pressure condition in the line. This pressure may be adjusted by manual control 61 and is usually set at a value well below the normal full pressure desired during the working stroke. A suitable valve for this purpose is the Vickers type C–175C.

A check valve 62 in line 63 connects the bleed from relief control 60 with supply line 30, the check valve being connected in such direction as to allow a flow from the relief control into supply line 30 when the pressure in the latter is lower than that in line 19, but to prevent reverse flow through line 63 when the pressure in supply line 30 is higher than that in line 19. Analysis of the system will show therefore that the differential relief control is ineffective during forward travel of the motor, but becomes effective upon reverse travel of the motor, and provides for supplying pressure at a predetermined value less than the full or normal value, as determined by the setting of the control 61, by by-passing a portion of the pressure fluid from valve 16 back to the tank by way of line 30 and the ports A and T of valve 25.

A cushion 70 similar to 55 comprising piston 71, cylinder 72, and spring 73 is connected in line 74 directly between supply line 30 and return line 44. The spring 73 under normal conditions maintains piston 71 in the closed position shown in which flow through line 74 is prevented. However when the motor is started at slow speed, that is, with fast valve 45 closed, it is found that there is a tendency for the motor to begin to move at a speed above the desired slow speed, until the fluid on the return side of the piston has filled up the return flow line 44 and conditioned the slow regulator 50 to its normal controlling condition, such initial jump at a rate in excess of the desired slow rate being objectionable. However this condition is overcome through the use of cushion 70 the function of which is to cause immediate travel of piston 71 toward the right in response to application of pressure to supply line 30. This occurs even before there has been any appreciable travel of the motor, since piston 70 is relatively small in mass as compared with the mass of the the motive power unit. As a result, the travel of piston 71 forces fluid in line 74, into return line 44, filling that line, and preconditioning slow regulator 50 so that it is filled with the liquid, and in condition to restrict and limit the flow of the main body of return fluid as soon as the motor starts to move. As a result, the travel of the motor is controlled from the outset, and it is permitted to move at only the desired slow rate, the piston 71 returning to its position as shown as soon as the transient conditions existing at the start of the operation have passed.

It is also desirable to provide for controlled transfer of the speed of the motor during its working stroke from fast to slow. If this were not controlled, such transfer would also result in a shock to the system, causing an undesirable condition with respect to the particular work being performed by the motor. In accordance with this invention such transfer is caused to take place under predetermined and controlled deceleration conditions such that the motor slows down rapidly but at a controlled rate from its high speed to its low speed condition. This is accomplished by the use of deceleration control valve 80 connected to return line 44 and having a discharge line 81 returning back to the tank 10. This valve is similar to control 60 and comprises a spring pressed valve member which can be manually adjusted by control 82 to unseat when the pressure exceeds a predetermined amount, thereby bleeding off liquid from the system, the rate of such bleeding off being such as to maintain a substantially uniform pressure in the return line, which in turn represents a controlled deceleration of the motor itself. Control 82 is therefor adjusted to remain closed at the normal pressure in return line 44, but to open when the pressure exceeds such normal, as is the case immediately following the closing of fast valve 45. As the excess fluid bleeds off under the driving inertia effect of the motor, its travel is gradually checked, and when the pressure returns to normal indicating that the motor is then traveling at the desired slow speed, valve 80 recloses and the system then continues to operate under the slow speed condition as previously described.

In operation, with the pump 13 delivering a substantially constant volume of fluid into pressure line 15, under idling conditions the directional valve 25 is completely deenergized and thus port P is connected with port T and the full flow of the pump is circulated back to the tank, without performing any work.

Assuming now that it is desired to have the motor perform a power stroke and to start under fast or high speed conditions, the solenoid 26 of valve 25 and solenoid 46 of valve 45 are simultaneously energized by suitable control switches. Fluid is then supplied through pressure line 20 to supply line 30 where it acts against piston 37, causing that piston to travel forward on its power or working stroke. The fluid on the discharge side of the piston returns through line 44, the open connection of fast valve 45, and return line 31 to port B which is connected with port T so that the discharge fluid returns freely to the tank. There is likewise a small flow through slow regulator 50 but it is insignificant in comparison with the much greater flow which takes place through fast valve 45. Flow through line 63 is prevented by check valve 62.

Immediately upon the fluid being supplied to the motor, there is a tendency for a pressure shock to occur in supply line 30 and in the pressure line 20 connected thereto. This tendency to shock is transmitted to the relief valve 16, through the vent port 18, and line 19 to vent cushion 55. Piston 56 rapidly responds to such pressure increase, and by yielding, reduces the pressure in line 19, and thereby correspondingly effecting reduction in the pressure in lines 20 and 30. In this way pressure build-up is reduced, and held to a level where it is not objectionable as would otherwise be the case. During this time the differential relief control 60 is rendered ineffective by reason of the check valve 62 which prevents flow through line 63.

Assuming now that it is desired to start the motor at slow speed, solenoid 26 of valve 25 is energized as before but solenoid 46 is deenergized, thereby closing fast valve 45. As the pressure is supplied to line 30, vent cushion 55 acts as already described, overcoming objectionable pressure build-up which tends to occur upon the initial opening of valve 25. At the same time, the pressure in line 30 is made effective upon piston 71 of cushion 70, causing that piston to inject fluid from the cylinder 72 into line 74, completely filling the discharge return line 44 and preconditioning slow regulator 50. Thus the motor is not permitted to jump ahead at a speed in excess of its desired slow speed, but moves forwardly smoothly at slow speed, as permitted by the restricted rate of flow of the discharge fluid, as governed by slow regulator 50. Thus smoothness of travel and substantial freedom of shock are secured under both fast and slow start conditions. During continued travel at slow speed, the principal volume of fluid is discharged by relief valve 16 through return line 17 to the tank, the desired full or normal pressure being maintained in pressure line 20, at reduced flow, by the action of this valve 16 and regulator 50.

The invention also provides for the starting of the motor at fast speed with a change to slow speed during the working stroke. To accomplish this both solenoids 26 and 46 are energized as before, causing the motor to start in high speed. At a proper point in the course of its cycle where it is desired to reduce the rate of travel the fast valve solenoid 46 is deenergized, thereby closing valve 45 and restricting the flow to that which occurs through slow regulator 50. During the transition, deceleration control valve 80 bleeds off the excess flow from return line 44 back to the tank, thereby establishing a controlled deceleration of the motor from its fast to its slow speed operating condition.

Figure 2:
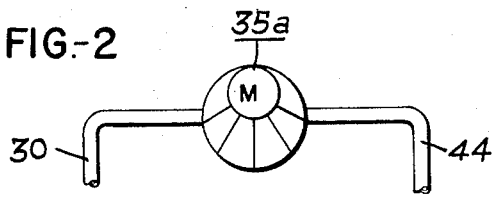
Fig. 2 is a fragmentary view showing a vane type motor in the same system.

To accomplish a return stroke, solenoid 27 of valve 25 is energized. This results in connecting pressure line 20 to return line 31 and through fast valve 45 which is simultaneously energized to return line 44, thereby supplying operating pressure to the small diameter side of the piston while allowing the fluid on the large diameter side thereof to flow back through line 30 and to return to the tank at substantially no pressure. Initial tendency to produce pressure shock is overcome through the action of vent cushion 55 in the same manner as described above, and in addition check valve 62 now allows a flow to take place through line 19, differential relief control 60, and line 63 to return line 30. As a result, the differential relief control 60 becomes effective and establishes a pressure at vent port 18 and hence in the pressure delivered to line 20 at a level as determined in advance by the setting thereof. Since a lesser pressure is required for the return of the motor than for its working stroke, the relief control 60 is set for a substantial reduction below normal pressure, which is thereby established in the pressure line 20 and transmitted to the motor. However the volume of flow is maintained and likewise with a piston type motor it will be evident that there is a substantially lesser area on the return side of the piston so that with the same volume of flow the motor will perform its return stroke more rapidly than its forward stroke. The fact the regulator valve 52 offers no resistance to flow in this direction provides for a greater volume of flow than on the working stroke and hence a vane type motor 35a as shown in Fig. 2 will also operate faster in reverse than on its forward or working stroke. The system thus provides for a relatively slow working or forward stroke at full pressure, and a faster return stroke at reduced pressure. As the piston of Fig. 1 reaches the end of its return stroke choke 40 checks its travel and causes it to reach its final position smoothly and without shock.

The hydraulic system herein described thus embodies highly desirable features which contribute to the proper, smooth, and regulated operation of a hydraulic motor, either a vane or a piston type, providing for the starting of that motor at either a fast or slow speed and substantially without shock or jump in its motion. for the deceleration of the motor from high to slow speed under controlled deceleration conditions, and for the stopping of the motor likewise substantially free of shocks. In addition it provides in a simple and highly satisfactory way for the performing of the normal working stroke at full pressure and at a predetermined speed with the return stroke being performed at a reduced pressure and at a higher speed where the motor is the piston type.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A hydraulic motive power system adapted to be operated smoothly and substantially free of shock from a substantially constant volume source of fluid pressure comprising a hydraulic motor, a fast-acting directional valve for connecting and disconnecting said fluid pressure source with said motor for actuation thereof, an adjustable pressure relief valve in the fluid supply line between said source and said directional valve having a vent port the pressure in which controls the pressure delivered by said pressure relief valve, and a vent cushion connected to said vent port adapted to yield in response to pressure surges at said vent port resulting from corresponding surges in said supply line occurring upon opening and closing of said directional valve to reduce pressure shocks on the delivery side of said pressure relief valve with corresponding smooth operation of said motor.

2. A hydraulic motive power system including a hydraulic motor adapted to be operated smoothly and substantially free of shocks in forward and reverse directions from a substantially constant volume source of fluid pressure comprising supply and return lines connected to said motor, a directional valve for reversing the direction of flow through said supply and return lines to cause selective forward and reverse operation of said motor, operation of said directional valve causing abrupt changes in flow through said supply and return lines tending to produce pressure surges therein, an adjustable pressure relief valve in the fluid supply line between said source and said directional control valve, said pressure relief valve having a vent port the pressure in which is effective to control the pressure delivered by said relief valve, and a yieldable vent cushion connected to said vent port and adapted to yield in response to such pressure surges to cause corresponding actuation of said relief valve to reduce the pressure surges delivered therefrom with corresponding maintained smooth conditions in the pressure supplied to said motor and corresponding smooth operation thereof.

3. A hydraulic motive power system for the operation of a hydraulic motor from a substantially constant volume source of fluid pressure under smooth starting and operating conditions comprising supply and return lines connected with said motor, a directional valve in the supply line from said pressure source for connecting and disconnecting said pressure source with said supply line, a slow regulator in said return line for restricting the flow therethrough to a slow rate to limit said motor to operation at slow speed, and a cushion member connected to said supply line and responsive to initiation of said supply pressure in said supply line to deliver a preliminary charge of fluid into said return line to fill said return line and condition said slow regulator in advance of travel of said motor with resultant reduction of shock movement of said motor in response to initial supply of said fluid pressure.

4. A hydraulic motive power system for the operation of a hydraulic motor from a substantially constant volume source of fluid pressure under smooth starting and operating conditions comprising supply and return lines connected with said motor, a directional valve in the supply line from said pressure source for connecting and disconnecting said pressure source with said supply line, a slow regulator in said return line for restricting the flow therethrough to a slow rate to limit said motor to operation at slow speed, a cylinder connected at opposite ends to said supply line and to said return line, and a piston in said cylinder responsive to initiation of said supply pressure in said supply line and the associated one end of said cylinder to deliver a preliminary charge of fluid from the other end of said cylinder into said return line to fill said return line and condition said slow regulator in advance of travel of said motor with resultant reduction of shock movement of said motor in response to initial supply of said fluid pressure.

5. A hydraulic motive power system for the operation of a hydraulic motor from a substantially constant volume source of fluid pressure under smooth starting and operating conditions comprising supply and return lines connected with said motor, a directional valve in the supply line from said pressure source for connecting and disconnecting said pressure source with said supply line, a slow regulator in said return line for restricting the flow therethrough to a slow rate to limit said motor to operation at slow speed, a cylinder connected at opposite ends to said supply line and to said return line, and a piston in said cylinder responsive to initiation of said supply pressure in said supply line and the associated one end of said cylinder to deliver a preliminary charge of fluid from the other end of said cylinder into said return line to fill said return line and condition said slow regulator in advance of travel of said motor with resultant reduction of shock movement of said motor in response to initial supply of said fluid pressure, and yieldable means for returning said piston to a normal position within said cylinder adjacent the supply line end thereof following the initial transient conditions occurring upon actuation of said directional valve preventing flow of fluid between said supply and return lines.

6. A hydraulic motive power system adapted to be operated smoothly and substantially free of shock from a substantially constant volume source of fluid pressure comprising a hydraulic motor, supply and return lines connected with said motor, a fast-acting directional valve for connecting and disconnecting said fluid pressure source with said supply line for actuation of said motor, an adjustable pressure relief valve in the fluid supply line between said source and said directional valve having a vent port the pressure in which controls the pressure delivered by said pressure relief valve, a vent cushion connected to said vent port adapted to yield in response to pressure surges at said vent port resulting from corresponding surges in said supply line occurring upon opening and closing of said directional valve to reduce pressure shocks on said pressure relief valve with corresponding smooth operation of said motor, a slow regulator in said return line for restricting the flow therethrough to a slow rate limiting said motor to operation at slow speed, and a cushion member connected to said supply line and responsive to initiation of said supply pressure in said supply line to deliver a preliminary charge of fluid into said return line to fill said return line and condition said slow regulator in advance of travel of said motor with resultant reduction of shock movement of said motor in response to initial supply of said fluid pressure.

7. A hydraulic motive power system for a hydraulic motor adapted to be operated from a substantially constant volume source of pressure fluid comprising supply and return lines connecting with said motor, a directional control valve for reversing the direction of flow of fluid through said supply and return lines to cause forward and reverse travel of said motor, a pressure line from said source of pressure fluid, a pressure relief valve in said pressure line having a vent port the pressure in which controls the pressure delivered by said relief valve to said directional control valve, a differential relief control connected with said vent port for reducing the pressure therein with corresponding reduction of the pressure delivered by said relief valve, and a one-way flow valve connected between said differential relief control and said supply line arranged to be blocked during the normal direction of flow through said supply line to maintain full pressure during forward travel of said motor but to open in response to reverse flow therethrough reducing the pressure in said vent port by by-passing a portion of said fluid flow into the return flow from said supply line and correspondingly reducing the pressure delivered by said pressure relief valve to said return line providing for reverse travel of said motor under reduced pressure conditions.

8. A hydraulic motive power system for a hydraulic motor adapted to be operated from a substantially constant volume source of pressure fluid comprising supply and return lines connecting with said motor, a directional control valve for reversing the direction of flow of fluid through said supply and return lines to cause forward and reverse travel of said motor, a pressure line from said source of pressure fluid, a pressure relief valve in said pressure line having a bent port the pressure in which controls the pressure delivered by said relief valve to said directional control valve, a differential relief control connected with said vent port for reducing the pressure therein with corresponding reduction of the pressure delivered by said relief valve, a one-way flow connection from said differential control to said supply line arranged to be blocked during the normal direction of flow through said supply line but to open in response to reverse flow therethrough with corresponding reduction in the pressure in said vent port by by-passing a portion of said fluid flow into the return flow from said supply line and correspondingly of the pressure delivered by said pressure relief valve to said return line providing for reverse travel of said motor under reduced pressure conditions, and means for varying the pressure of said differential relief control to establish a controlled pressure for said motor during the reverse travel thereof.

9. A hydraulic motive power system adapted to be supplied from a constant volume source of fluid pressure comprising a motor unit, supply and return lines connected to said motor, a one-way regulator valve in said return line for limiting the volume of flow therethrough in the direction away from said motor while affording substantially no restriction to flow in the opposite direction, a directional control valve for reversing the direction of flow of fluid through said supply and return lines to cause forward and reverse travel of said motor, a pressure line from said source of pressure fluid, a pressure relief valve in said pressure line having a vent port the pressure in which controls the pressure delivered by said relief valve, a differential relief control connected with said vent port for bleeding fluid through said vent port with corresponding reduction in the pressure delivered by said relief valve, a one-way flow connection between said differential relief control and said supply line arranged to be blocked during normal flow through said supply line providing for forward travel of said piston at slow speed and under full pressure, said one-way flow connection being open to provide for reduction of the pressure in said vent port and correspondingly in said pressure relief valve by by-passing a portion of said fluid flow into the return flow from said supply line in response to the reverse position of said directional control valve providing for return travel of said motor at high speed and under reduced pressure conditions.

10. A hydraulic motive power system adapted to be supplied from a constant volume source of fluid pressure comprising a motor unit including a cylinder and a piston having a differential area on its opposite sides, supply and return lines connected to said cylinder and communicating with the large and small area sides of said piston respectively, a directional control valve for reversing the direction of flow of fluid through said supply and return lines to cause forward and reverse travel of said piston, a pressure line from said source of pressure fluid, a pressure relief valve in said pressure line having a vent port the pressure in which controls the pressure delivered by said relief valve, a differential relief control connected with said vent port for bleeding fluid through said vent port with corresponding reduction in the pressure delivered by said relief valve, a one-way flow connection between said differential relief control and said supply line arranged to be blocked during normal flow through said supply line providing for forward travel of said piston at slow speed and under full pressure, said one-way flow connection being open to provide for reduction of the pressure in said vent port by by-passing a portion of said fluid flow into the return flow from said supply line and correspondingly in said pressure relief valve to said return line in response to the reverse position of said directional control valve providing for return travel of said piston at high speed and under reduced pressure conditions.

References Cited in the file of this patent

UNITED STATES PATENTS

| | | |
|---|---|---|
| 706,688 | Reynders et al. | Aug. 12, 1902 |
| 1,904,112 | Achard | Apr. 18, 1933 |
| 2,043,453 | Vickers | June 9, 1936 |
| 2,374,243 | Somes | Apr. 24, 1945 |
| 2,375,255 | Snader | May 8, 1945 |